(12) United States Patent
Mak et al.

(10) Patent No.: US 12,375,788 B2
(45) Date of Patent: Jul. 29, 2025

(54) MICRO GIMBAL STABILIZER (MGS) CAMERA MODULE

(71) Applicant: VISTA INNOTECH LIMITED, Hong Kong (HK)

(72) Inventors: Lin Chi Mak, Hong Kong (HK); Jing Li, Hong Kong (HK)

(73) Assignee: VISTA INNOTECH LIMITED, Hong Kong (HK)

( * ) Notice: Subject to any disclaimer, the term of this patent is extended or adjusted under 35 U.S.C. 154(b) by 195 days.

(21) Appl. No.: 18/201,169

(22) Filed: May 23, 2023

(65) Prior Publication Data
US 2023/0379563 A1 Nov. 23, 2023

(30) Foreign Application Priority Data

May 23, 2022 (CN) .......................... 202210565898.1

(51) Int. Cl.
*H04N 23/54* (2023.01)
*F16M 11/12* (2006.01)
*G03B 13/32* (2021.01)
*H02K 41/035* (2006.01)
(Continued)

(52) U.S. Cl.
CPC ........... *H04N 23/54* (2023.01); *F16M 11/123* (2013.01); *G03B 13/32* (2013.01); *H02K 41/0354* (2013.01); *H04N 23/685* (2023.01); *H04N 23/51* (2023.01)

(58) Field of Classification Search
CPC ...... H04N 23/54; H04N 23/685; H04N 23/51; H04N 23/67; H04N 23/00; H04N 23/687; H04N 23/57; F16M 11/123; G03B 13/32; G03B 5/00; G03B 13/34; G03B 30/00; G03B 5/04; G03B 3/10; G03B 2205/0023;
(Continued)

(56) References Cited

U.S. PATENT DOCUMENTS

2007/0275596 A1* 11/2007 Ryu ..................... H01L 31/0203
439/567
2017/0123180 A1* 5/2017 Osaka .................. G02B 27/646
(Continued)

FOREIGN PATENT DOCUMENTS

CN 208399865 U 1/2019
CN 112034662 A 12/2020
(Continued)

*Primary Examiner* — Albert H Cutler

(57) ABSTRACT

A micro gimbal stabilizer (MGS) camera module includes an MGS and a camera module, where the MGS includes gimbal drive assemblies, a movable gimbal portion, and a static gimbal portion movably connected to the movable gimbal portion; a gimbal magnet is provided on the movable gimbal portion; the camera module includes a movable focusing portion, a static focusing portion, a focusing drive assembly, and a focusing feedback assembly; the static focusing portion is relatively fixed with the movable gimbal portion; and a position magnet is provided on the static focusing portion. In response to a focusing process of the camera module, the focusing position sensor is relatively fixed with the gimbal magnet and the focusing magnet, which can effectively reduce influences of magnetic fields of the gimbal magnet and the focusing magnet on the focusing position sensor.

19 Claims, 16 Drawing Sheets

(51) Int. Cl.
*H04N 23/51* (2023.01)
*H04N 23/68* (2023.01)

(58) Field of Classification Search
CPC ....... G03B 2205/0069; H02K 41/0354; H02K 41/0356; G02B 7/00; G02B 7/04
See application file for complete search history.

(56) References Cited

U.S. PATENT DOCUMENTS

2019/0196139 A1\* 6/2019 Lee .................. G02B 27/646
2020/0012068 A1\* 1/2020 Lim .................. H05K 1/181

FOREIGN PATENT DOCUMENTS

CN 214380329 U 10/2021
CN 217954818 U 12/2022

\* cited by examiner

MICRO GIMBAL STABILIZER (MGS) CAMERA MODULE

CROSS REFERENCE TO RELATED APPLICATIONS

The present application claims the benefit of Chinese Patent Application No. 202210565898.1 filed on May 23, 2022, the contents of which are incorporated herein by reference in their entirety.

TECHNICAL FIELD

The present disclosure relates to a technical field of photographing, and in particular to a micro gimbal stabilizer (MGS) camera module.

BACKGROUND

In recent years, compact mobile devices having a photographing function, including aerial cameras, sports cameras and automobile data recorders, have been popularized and applied to many fields. The compact mobile device includes at least one compact camera module. Hence, there are a huge market and a rising trend for the camera module.

When the compact mobile device is used to take photos and films, the photos and films are prone to blurs or drifts due to external vibrations, with an undesirable quality. The problem is particularly severe in the case of intense vibrations or low-light scenarios.

In order to solve problems above, different compact stabilizer techniques are emergent in markets. It is highly desirable to improve the image quality by mechanically compensating the blurs or drifts arising from the vibrations. For existing rotary-stabilizing camera modules, magnetic fields generated by a gimbal magnet in an MGS, and a focusing magnet in a camera module easily cause interferences to the stabilizing or focusing process, such that an electronic sensing component cannot be provided to realize closed-loop control of focusing.

SUMMARY

An objective of the present disclosure is to provide an MGS camera module, which can realize closed-loop control of focusing and achieve better focusing accuracy and stability, while realizing stabilizing and focusing functions.

To achieve the above objective, the present disclosure provides an MGS camera module, including:
an MGS including a movable gimbal portion, a static gimbal portion movably connected to the movable gimbal portion, and gimbal drive assemblies, where the gimbal drive assemblies are capable of driving the movable gimbal portion to rotate relative to the static gimbal portion, the gimbal drive assemblies each include a gimbal coil and a gimbal magnet that are opposite to each other, the gimbal coil is provided on the static gimbal portion, and the gimbal magnet is provided on the movable gimbal portion;
a camera module including a movable focusing portion, a static focusing portion movably connected to the movable focusing portion, a focusing drive assembly, and a focusing feedback assembly, where the static focusing portion is relatively fixed with the movable gimbal portion, the focusing drive assembly is capable of driving the movable focusing portion to move relative to the static focusing portion along an optical axis direction, the focusing drive assembly includes a focusing coil and a focusing magnet that are opposite to each other, the focusing coil is provided on the movable focusing portion, the focusing magnet is provided on the static focusing portion, the focusing feedback assembly includes a focusing position sensor and a position magnet, the position magnet is provided on the movable focusing portion, and the focusing position sensor is provided on the static focusing portion; and
at least one control unit, wherein the control unit is configured to generate a first control signal according to a first detection signal sent from the focusing position sensor and control a moving distance of the movable focusing portion.

In some embodiments of the present disclosure, minimum distances from the focusing position sensor and the position magnet to the gimbal coil, the gimbal coil and the focusing magnet are greater than 10% of a height of the MGS camera module along the optical axis direction.

In some embodiments of the present disclosure, the camera module is a cuboid, at least one edge of the camera module is provided with the gimbal magnet and the focusing magnet, and the position magnet is provided at a position of the movable focusing portion corresponding to at least one corner of the camera module.

In some embodiments of the present disclosure, multiple sets of the gimbal drive assemblies are provided, and the gimbal coil in each of the multiple sets of the gimbal drive assemblies is capable of being controlled independently.

In some embodiments of the present disclosure, the camera module is provided with two sets of the gimbal drive assemblies which are respectively arranged at two sides of the camera module in a direction perpendicular to an optical axis, and the gimbal coil of each of the two sets of the gimbal drive assemblies is capable of being controlled independently.

In some embodiments of the present disclosure, the MGS camera module further includes a gravity sensing unit, where the control unit is configured to generate a second control signal according to a second detection signal fed back from the gravity sensing unit, thereby controlling the gimbal coil to generate an electromagnetic force having preset parameters.

In some embodiments of the present disclosure, the MGS camera module further includes a gimbal position detection unit, where the gimbal position detection unit is provided at a central position of the gimbal coil, and the control unit is configured to generate a third control signal according to a third detection signal fed back from the gimbal position detection unit, thereby controlling the gimbal coil to generate an electromagnetic force having preset parameters; and
the third detection signal is position information of the movable gimbal portion relative to the static gimbal portion, and the preset parameters include a direction and a magnitude of the electromagnetic force.

In some embodiments of the present disclosure, an included angle between an electromagnetic force generated by the gimbal coil and the optical axis direction is not greater than 20°.

In some embodiments of the present disclosure, the camera module further includes a lens and a circuit board; the gimbal coil, the focusing coil, the focusing position sensor, and the control unit are all electrically connected to the circuit board; the circuit board includes a movable circuit portion, an elastic circuit portion, and a static circuit portion; the elastic circuit portion is connected to the movable circuit portion and the static circuit portion respectively; the movable circuit portion is connected to the static focusing portion; the static circuit portion is connected to the static gimbal portion; the movable circuit portion is provided with an image sensor; and the lens is provided above the image sensor and connected to the movable focusing portion.

In some embodiments of the present disclosure, the movable circuit portion includes a movable connecting segment and a mounting panel, the movable connecting segment includes one end connected to the elastic circuit portion, and the other end inclining and extending toward a direction away from the elastic circuit portion and being connected to the mounting panel, and the image sensor is provided on the mounting panel.

In some embodiments of the present disclosure, a minimum distance between the image sensor and the elastic circuit portion along the optical axis direction is greater than 10% of a height of the MGS camera module along the optical axis direction, and the elastic circuit portion is provided above the image sensor.

In some embodiments of the present disclosure, the elastic circuit portion is provided outside the MGS.

In some embodiments of the present disclosure, the elastic circuit portion includes at least two circuit layers, and a spacing is provided between two of the circuit layers.

In some embodiments of the present disclosure, the elastic circuit portion includes a first elastic arm and a second elastic arm, one end of the first elastic arm and one end of the second elastic arm are fixedly connected to the movable circuit portion, the other end of the first elastic arm and the other end of the second elastic arm are fixedly connected to the static circuit portion, and the first elastic arm and the second elastic arm surround the MGS.

In some embodiments of the present disclosure, the static circuit portion is provided with a socket.

In some embodiments of the present disclosure, an outer sidewall of the gimbal magnet protrudes toward the gimbal coil to form a bump.

In some embodiments of the present disclosure, the bump comprises an arc surface, a cylindrical surface, a spherical surface, or a chamfered surface, the arc surface, the cylindrical surface, the spherical surface, or the chamfered surface being formed by protruding the outer sidewall of the gimbal magnet toward the gimbal coil.

In some embodiments of the present disclosure, the MGS further includes elastic gimbal components respectively connected to the movable gimbal portion and the static gimbal portion.

In some embodiments of the present disclosure, there are at least three elastic gimbal components that are arranged along a circumferential direction of the optical axis and located on at least three unparallel planes.

In some embodiments of the present disclosure, the camera module further includes an elastic focusing component connected to the movable focusing portion and the static focusing portion respectively.

In some embodiments of the present disclosure, the elastic focusing component includes an upper supporting spring piece and a lower supporting spring piece for supporting and suspending the movable focusing portion; the upper supporting spring piece includes one end fixed on the movable focusing portion, and the other end fixed on the static focusing portion; and the lower supporting spring piece includes one end fixed on the movable focusing portion, and the other end fixed on the static focusing portion.

In some embodiments of the present disclosure, the static gimbal portion further includes a gimbal base and a conductive structure, the conductive structure is provided on the gimbal base and electrically connected to the circuit board, and the control unit and the gimbal coil are fixed with and electrically connected to the conductive structure.

In some embodiments of the present disclosure, the MGS camera module further includes a bottom housing and an outer housing, where the outer housing and the bottom housing are cooperatively fixed, and a space formed by the bottom housing and the outer housing is configured to accommodate the MGS and the camera module.

The present disclosure achieves the following technical effects by implementing the embodiments:

In response to a focusing process of the camera module, the focusing position sensor is relatively fixed with the gimbal magnet and the focusing magnet, which can effectively reduce influences of magnetic fields generated by the gimbal magnet, the focusing magnet and the gimbal coil on the focusing position sensor and the position magnet in the focusing process. Therefore, the present disclosure improves accuracy that the position magnet and the focusing position sensor correspondingly obtain a position of the movable focusing position relative to the static focusing portion, realizes the closed-loop control of focusing of the control unit on the focusing process of the camera module, and achieves better focusing stability and accuracy of the camera module.

BRIEF DESCRIPTION OF THE DRAWINGS

The present disclosure is described below in more details in combination with the accompanying drawings. The present disclosure does not depend on a special combination of technical features. Technical features shown in the accompanying drawings and/or illustrated below are all technical features of the present disclosure and corresponding improvements of the present disclosure.

It is to be noted that the same reference numeral refers to the same or approximately the same component in different drawings.

REFERENCE NUMERALS

A: MGS;
1: movable gimbal portion, 11: elastic gimbal component, 2: static gimbal portion, 21: gimbal base, 22: conductive structure, 3: gimbal drive assembly, 31: gimbal coil, 32: gimbal magnet, and 321: bump;
B: camera module;
4: movable focusing portion, 41: elastic focusing component, 411: upper supporting spring piece, 412: lower supporting spring piece, 5: static focusing portion, 51: focusing magnet seat, 52: focusing base, 6: focusing drive assembly, 61: focusing coil, 62: focusing magnet, 7: focusing feedback assembly, 71: focusing position sensor, and 72: position magnet;
8: circuit board, 81: movable circuit portion, 811: movable connecting segment, 812: mounting panel, 82: elastic circuit portion, 821: first elastic arm, 822: second elastic arm, 823: circuit layer, 824: spacing, 83: static circuit portion, and 84: socket; and
9: control unit, 10: gimbal position detection unit, 101: lens, 102: image sensor, 103: gravity sensing unit, C: bottom housing, D: outer housing, and E: optical axis.

DETAILED DESCRIPTION

The specific implementations of the present disclosure are described in more detail below with reference to the accompanying drawings and embodiments. The following embodiments are used to illustrate the present disclosure, but are not used to limit the scope of the present disclosure.

Figure 1:
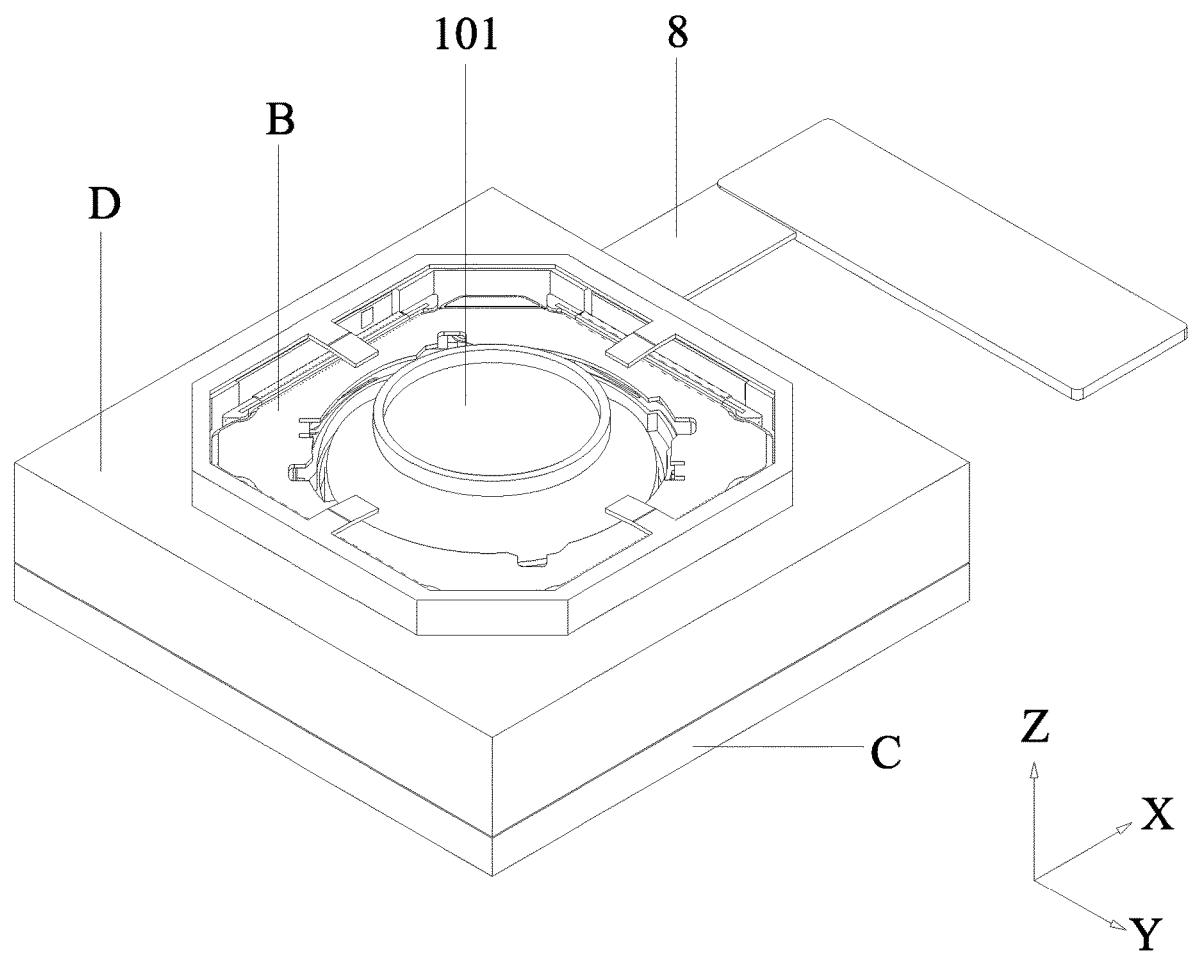
FIG. 1 is a schematic structural view according to Embodiment 1 of the present disclosure.
Figure 2:
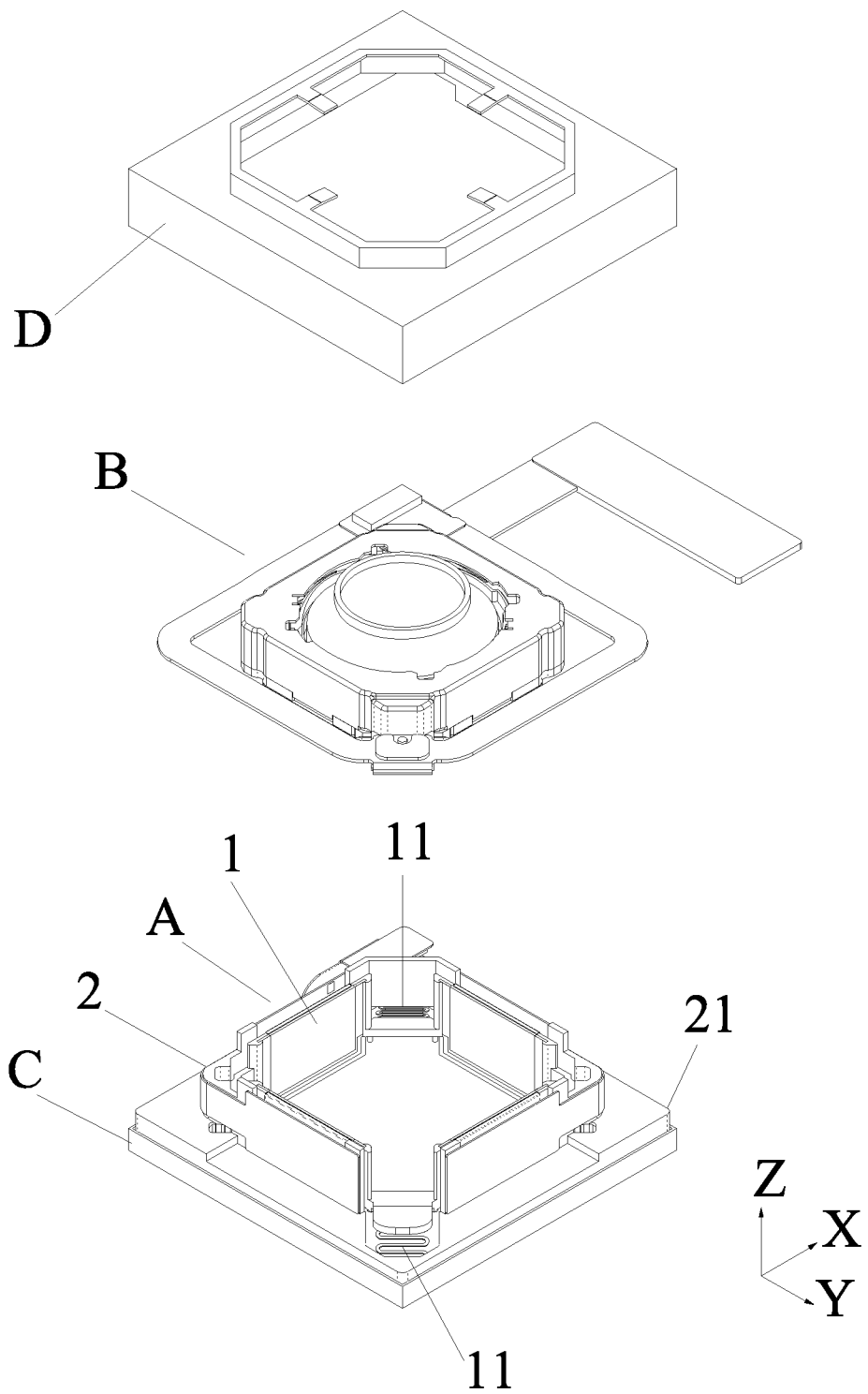
FIG. 2 is an exploded view according to Embodiment 1 of the present disclosure.

For ease of description, it is to be noted that an optical axis E direction of the MGS camera module is defined as a Z direction. A photographed object in the optical axis E direction is located above a camera module. The first direction perpendicular to an optical axis E refers to an X direction. From FIG. 1, the X direction is parallel to an edge of an outer housing D at a bottom right corner in FIG. 1. The second direction perpendicular to the optical axis E and the first direction refers to a Y direction. From FIG. 1, the Y direction is parallel to an edge of the outer housing D at a bottom left corner in FIG. 1. The direction close to the optical axis E in the X and Y directions refers to an inside, while the direction away from the optical axis E direction refers to an outside. Likewise, definitions on the X, Y and Z directions as well as on the front, rear, inside and outside are also applicable to the accompanying drawings described hereinafter.

In addition, the direction rotating around the X direction refers to an Rx direction. Specifically, around the X direction, the clockwise rotating direction is an Rx+ direction, while the counterclockwise rotating direction is an Rx− direction. The direction rotating around the Y direction refers to an Ry direction. Specifically, around the Y direction, the clockwise rotating direction is an Ry+ direction, while the counterclockwise rotating direction is an Ry− direction.

The definitions on the X, Y and Z directions as well as on the front, rear, inside and outside are merely intended to conveniently describe a position relationship or connecting relationship between various components of the MGS camera module in the embodiments of the present disclosure, and do not form any limitations to the embodiments of the present disclosure.

It is also to be noted that for same components or parts in the embodiments of the present disclosure, only one of the components or parts may be taken as an example to mark the reference numeral. It should be understood that the reference numeral is also applicable to other same components or parts.

It is to be noted that the term "include" does not exclude other elements or steps, and the term "a" or "an" does not exclude a plural form.

In addition, it is further to be noted that, for any single technical feature described or implied in the embodiments of the present disclosure, or any single technical feature illustrated or implied in the accompanying drawings, these technical features (or equivalents thereof) can still be combined to obtain other embodiments not directly mentioned in the present disclosure.

It should be further understood that the terms such as "first", "second", and the like are used in the present disclosure are used to describe various information, but the information should not be limited to these terms, and these terms are only used to distinguish the same type of information from each other. For example, without departing from the scope of the present disclosure, "first" information may be referred to as "second" information, and similarly, "second" information may be referred to as "first" information.

Embodiment 1

Referring to FIGS. 1-11, the embodiment of the present disclosure provides an MGS camera module, including a control unit 9, an MGS A, a camera module B, a bottom housing C, and an outer housing D. The bottom housing C and the outer housing D are cooperatively fixed to form a space for accommodating the MGS A and the camera module B. Both the MGS A and the camera module B are arranged in the space. Specifically, there is at least one control unit 9. In other embodiments, multiple control units 9 electrically connected to each other may be provided as required to control multiple parts and components.

Referring to FIG. 3, and FIG. 5 to FIG. 8, the MGS A includes a movable gimbal portion 1, a static gimbal portion 2 movably connected to the movable gimbal portion 1, and gimbal drive assemblies 3. The gimbal drive assemblies 3 are capable of driving the movable gimbal portion 1 to rotate relative to the static gimbal portion 2. The static gimbal portion 2 includes a conductive structure 22 and a gimbal base 21. The gimbal base 21 is fixedly connected to the bottom housing C. The conductive structure 22 is fixedly connected to the gimbal base 21. The gimbal drive assemblies 3 each include a gimbal magnet 32 and a gimbal coil 31. The control unit 9 and the gimbal coil 31 are fixed on the conductive structure 22 and electrically connected to the conductive structure 22. The movable gimbal portion 1 serves as a gimbal magnet seat. The gimbal magnet 32 is fixedly connected to the gimbal magnet seat and opposite to the gimbal coil 31. The gimbal magnet seat is movably connected to the gimbal base 21 through elastic gimbal components 11.

In some implementations, the gimbal magnet 32 is fixed on an outer sidewall of the gimbal magnet seat. The gimbal coil 31 is fixed on an inner surface of the conductive structure 22. The gimbal magnet 32 is provided inside the gimbal coil 31 and opposite to the gimbal coil 31, and configured to provide a magnetic field.

Referring to FIG. 4 to FIG. 8, the camera module B includes a lens 101, a circuit board 8, a movable focusing portion 4, a static focusing portion 5 movably connected to the movable focusing portion 4, a focusing drive assembly 6, and a focusing feedback assembly 7. The static focusing portion 5 is fixedly connected to the movable gimbal portion 1. The focusing drive assembly 6 is capable of driving the movable focusing portion 4 to move along an optical axis direction relative to the static focusing portion 5. The focusing drive assembly 6 includes a focusing coil 61 and a focusing magnet 62 that are opposite to each other. The focusing coil 61 is provided on the movable focusing portion 4. The focusing magnet 62 is provided on the static focusing portion 5. The focusing feedback assembly 7 includes a focusing position sensor 71 and a position magnet 72. The position magnet 72 is provided on the movable focusing portion 5. The focusing position sensor 71 is provided on the static focusing portion 4.

The gimbal coil 31, the focusing coil 61, the focusing position sensor 71 and the control unit 9 are electrically connected to the circuit board 8. The control unit 9 is configured to generate a first control signal according to a first detection signal sent from the focusing position sensor 71, such that the focusing coil 61 generates an electromagnetic force having preset parameters to control a moving distance of the movable focusing portion 4. In response to a focusing process of the camera module B, the focusing position sensor 71 is relatively fixed with the gimbal magnet 32 and the focusing magnet 62, which can effectively reduce influences of magnetic fields generated by the gimbal coil 31, the gimbal magnet 32 and the focusing magnet 62 on the focusing position sensor 71 in the focusing process. Therefore, the present disclosure obtains a more accurate position of the movable focusing portion 4 relative to the static focusing portion 5 when the position magnet 72 corresponds to the focusing position sensor 71, realizes closed-loop control of focusing of the control unit 9 on the focusing process of the camera module B, and achieves better focusing stability and accuracy of the camera module B.

Specifically, the movable focusing portion 4 in the embodiment of the present disclosure serves as a focusing coil seat. The static focusing portion 5 includes a focusing magnet seat 51 and a focusing base 52. The focusing magnet 62 is fixed on an inner sidewall of the focusing magnet seat 51, located outside the focusing coil 61, and configured to provide a magnetic field. The focusing magnet seat 51 is relatively fixed with the focusing base 52. The focusing coil seat is movably connected to the focusing magnet seat 51 through an elastic focusing component 41. The elastic focusing component 41 includes an upper supporting spring piece 411 and a lower supporting spring piece 412 for supporting and suspending the focusing coil seat. The upper supporting spring piece 411 includes one end fixed on the focusing coil seat, and the other end fixed on the focusing magnet seat 51. The lower supporting spring piece 412 includes one end fixed on the focusing coil seat, and the other end fixed on the focusing magnet seat 51.

In other embodiments, the static portion and the movable portion of each of the MGS A and the camera module B may further move relatively through components such as a ball. Preferably, in the embodiment of the present disclosure, the elastic focusing component 41 and the elastic gimbal components 11, rather than the ball or other frictional contact points, are taken as a mechanical support structure between the static portion and the movable portion, which prevents a nonlinear frictional force in stabilization, and achieves a better stabilizing effect. Particularly, in the case of subtle vibrations and frequently-changing directions, the stabilizing effect is more desirable.

There are at least three elastic gimbal components 11 in the embodiment of the present disclosure. The at least three elastic gimbal components 11 are arranged along a circumferential direction of the optical axis E and located on at least three unparallel planes. An intersection to which the at least three elastic gimbal components 11 extend is in proximity to a center of rotation of a spring oscillator system. The spring oscillator system may be composed of the movable gimbal portion 1, the elastic gimbal components 11, and the gimbal base 21. The proximity refers to that a distance toward the center of rotation of the spring oscillator system is less than or equal to 20% of a cross-sectional diameter of the camera module B. There is almost no displacement for the center of rotation in movement of the MGS camera module, such that the stabilizing effect of the MGS A is improved. A plane where the elastic gimbal components 11 are located is in closer proximity to the center of rotation, thereby effectively lowering a power consumption. Specifically, there are four elastic gimbal components 11 in the embodiment.

Further, the camera module B includes an image sensor 102. The image sensor 102 is relatively fixed with the static focusing portion 5. In the embodiment of the present disclosure, there is basically no relative movement between the image sensor 102 and the lens 101 in photographing. Therefore, the image quality and the stabilizing effect are not reduced significantly at an edge of the image; and for the sake of stabilization, there is no need to sacrifice a part of an optical resolution of the lens 101 and a part of an optical resolution of the image sensor 102 to improve quality of a photographed image.

In the embodiment, minimum distances from the focusing position sensor 71 and the position magnet 72 to the gimbal coil 31, the gimbal coil 31 and the focusing magnet 62 are greater than 10% of a height of the MGS camera module along the optical axis E direction, which can reduce interferences of the gimbal magnet 32, the focusing magnet 62 and the gimbal coil 31 on the focusing position sensor 71 and the position magnet 72 to the maximum extent.

In the embodiment, the camera module B is a cuboid. At least one edge of the camera module B is provided with the gimbal magnet 32 and the focusing magnet 62. The position magnet 72 is provided at a position of the movable focusing portion 4 corresponding to at least one corner of the camera module B, such that the position magnet 72 is away from the gimbal magnet 32 and the focusing magnet 62, thereby further preventing magnetic fields generated by the gimbal magnet 32 and the focusing magnet 62 from interfering with a magnetic field generated by the position magnet 72, and improving accuracy and stability that the position magnet 72 and the focusing position sensor 71 correspondingly obtain relative positions of the movable focusing portion 4 and the static focusing portion 5.

It is to be noted that the MGS A in the embodiment of the present disclosure includes multiple sets of the gimbal drive assemblies 3. The camera module B includes at least one set of the focusing drive assembly 6. In other words, the MGS A and the camera module B respectively include at least two sets of the gimbal drive assemblies 3 and at least one set of the focusing drive assembly 6.

In the embodiment of the present disclosure, the MGS A includes four sets of the gimbal drive assemblies 3, and the camera module B includes four sets of the focusing drive assemblies 6. The four sets of the gimbal drive assemblies 3 and the four sets of the focusing drive assemblies 6 are respectively provided at four edges of the cuboid-shaped camera module B. One set of the gimbal drive assemblies 3 corresponds to one set of the focusing drive assemblies 6, and is provided at one edge of the cuboid. Any two sets of the gimbal drive assemblies 3 are provided therebetween with one of the elastic gimbal components 11. It is to be understood that the MGS A and the camera module B may include other numbers of the gimbal drive assemblies 3 and the focusing drive assemblies 6, such as two, three, six, eight or more gimbal drive assemblies and the focusing drive assemblies in other implementations.

In the embodiment of the present disclosure, in order to compensate displacements of the camera module B and the movable gimbal portion 1 along the optical axis E direction relative to the static gimbal portion 2 under a gravity action, the camera module B is provided with two sets of the gimbal drive assemblies 3 which are respectively arranged at two sides of the camera module in a direction perpendicular to an optical axis E, and the gimbal coil 31 of each of the two sets of the gimbal drive assemblies 3 is capable of being controlled independently.

It is to be noted that the gimbal coil 31 in each of the multiple sets of the gimbal drive assemblies 3 can be controlled independently in the embodiment of the present disclosure, and thus the stabilization and the compensation for influences of the gravity action can be realized. Specifically, during the compensation for the gravity action, the control unit 9 can control gimbal coils 31 in at least two sets of the gimbal drive assemblies 3 to generate electromagnetic forces of basically same direction and amplitude, such that the camera module B and the movable gimbal portion 1 are driven to move along the optical axis E direction, and to compensate displacements caused by the gravity action. Preferably, at least two opposite sides of the camera module B in the direction perpendicular to the optical axis E are provided with two sets of the gimbal drive assemblies 3. When the two sets of the gimbal drive assemblies 3 generate electromagnetic forces of a basically same direction, the camera module B and the movable gimbal portion 1 can move more stably and reliably along the optical axis E direction.

In the embodiment of the present disclosure, in response to a vibration in the Ry+ direction in stabilization, the electromagnetic force generated by the gimbal coil 31 in one set of the gimbal drive assemblies 3 increases upward along the Z direction, while the electromagnetic force generated by the gimbal coil 31 in another opposite set of the gimbal drive assemblies 3 increases downward along the Z direction. As a result, the movable gimbal portion 1 drives the camera module B to rotate toward the Ry− direction to achieve the stabilizing effect in the Ry direction. Conversely, the electromagnetic force generated by the gimbal coil 31 in one set of the gimbal drive assemblies 3 increases downward along the Z direction, while the electromagnetic force generated by the gimbal coil 31 in another opposite set of the gimbal drive assemblies 3 increases upward along the Z direction. As a result, the movable gimbal portion 1 drives the camera module B to rotate toward the Ry+ direction.

Figure 3:
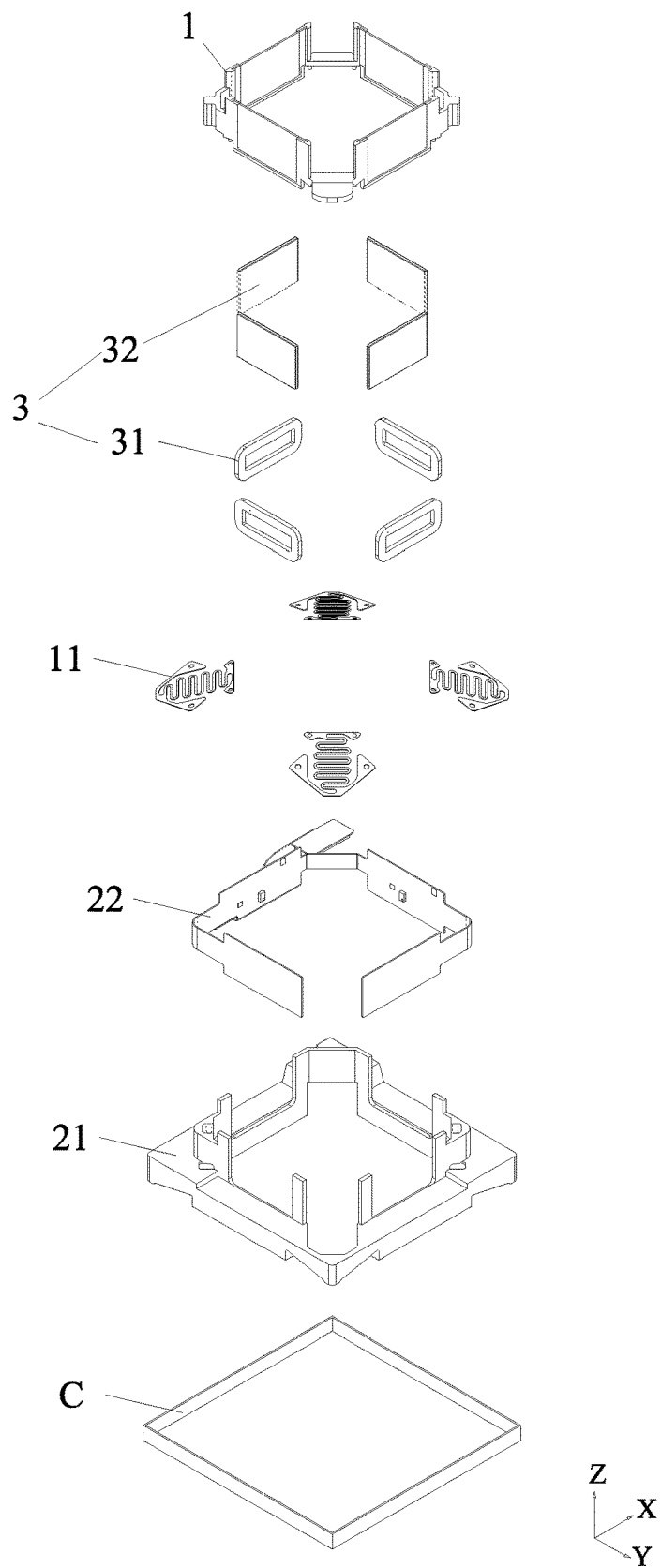
FIG. 3 is an exploded view of an MGS according to Embodiment 1 of the present disclosure.
Figure 4:
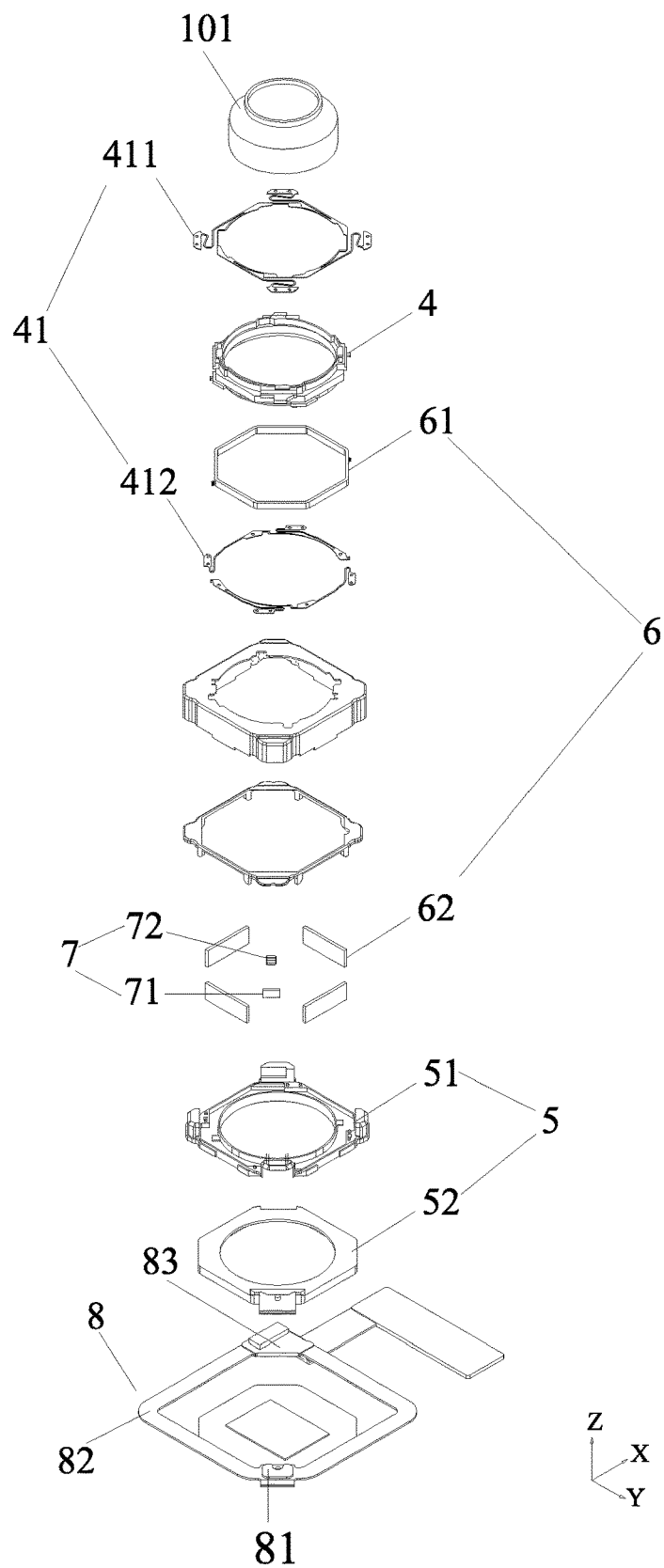
FIG. 4 is an exploded view of a camera module according to Embodiment 1 of the present disclosure.
Figure 5:
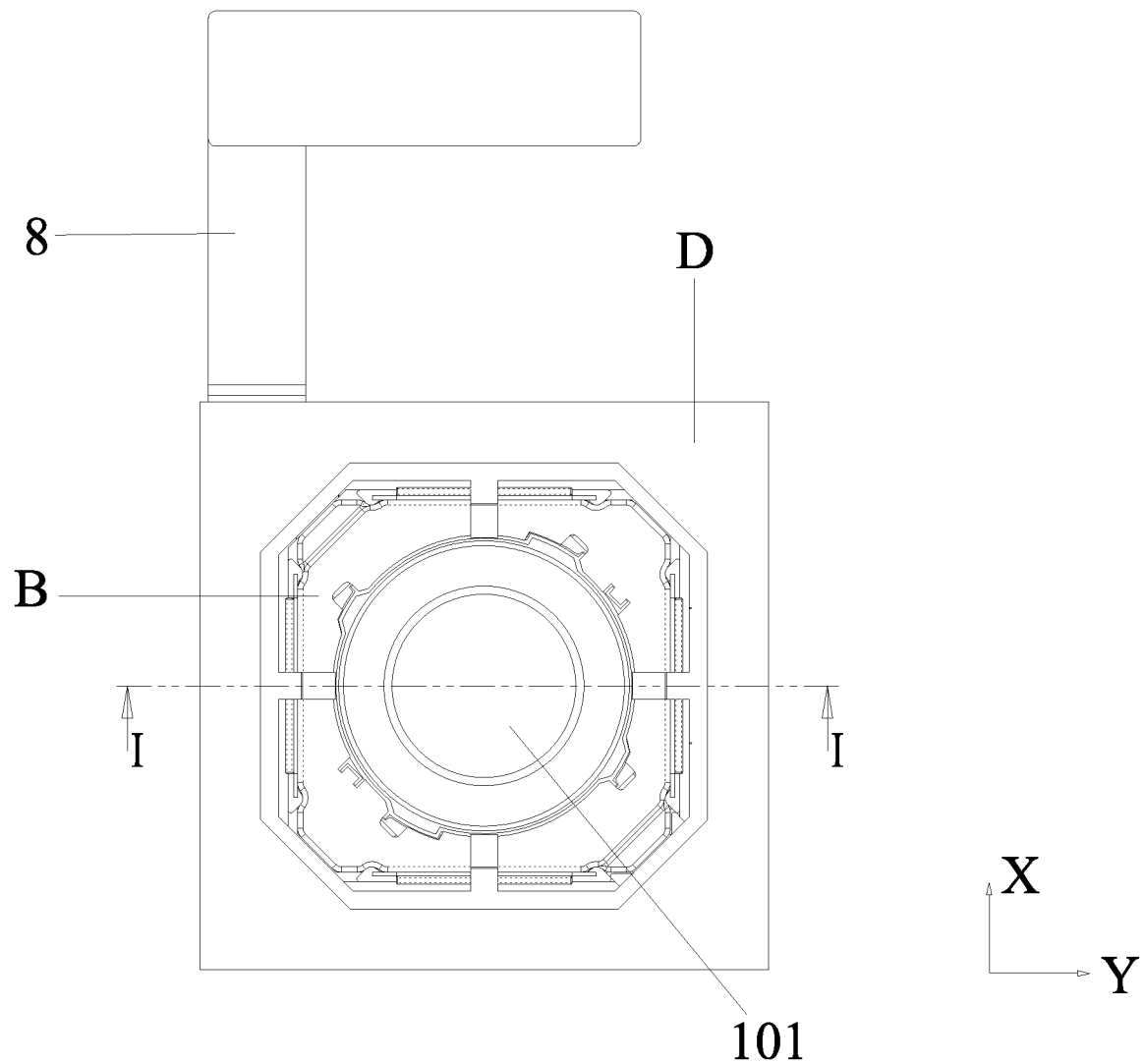
FIG. 5 is a top view from a perspective according to Embodiment 1 of the present disclosure.
Figure 6:
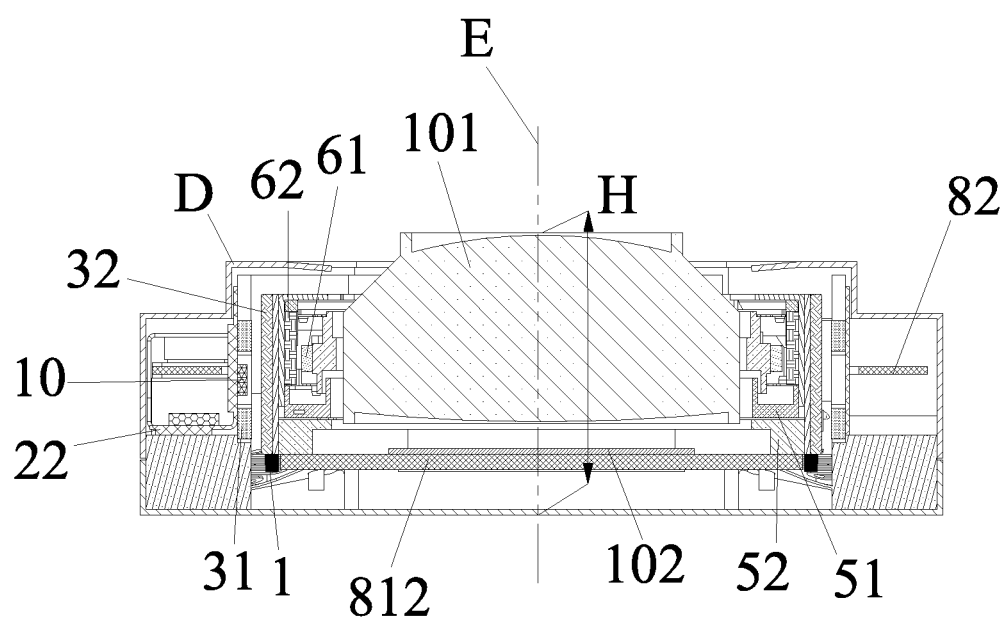
FIG. 6 is a sectional view of I-I in FIG. 5.
Figure 7:
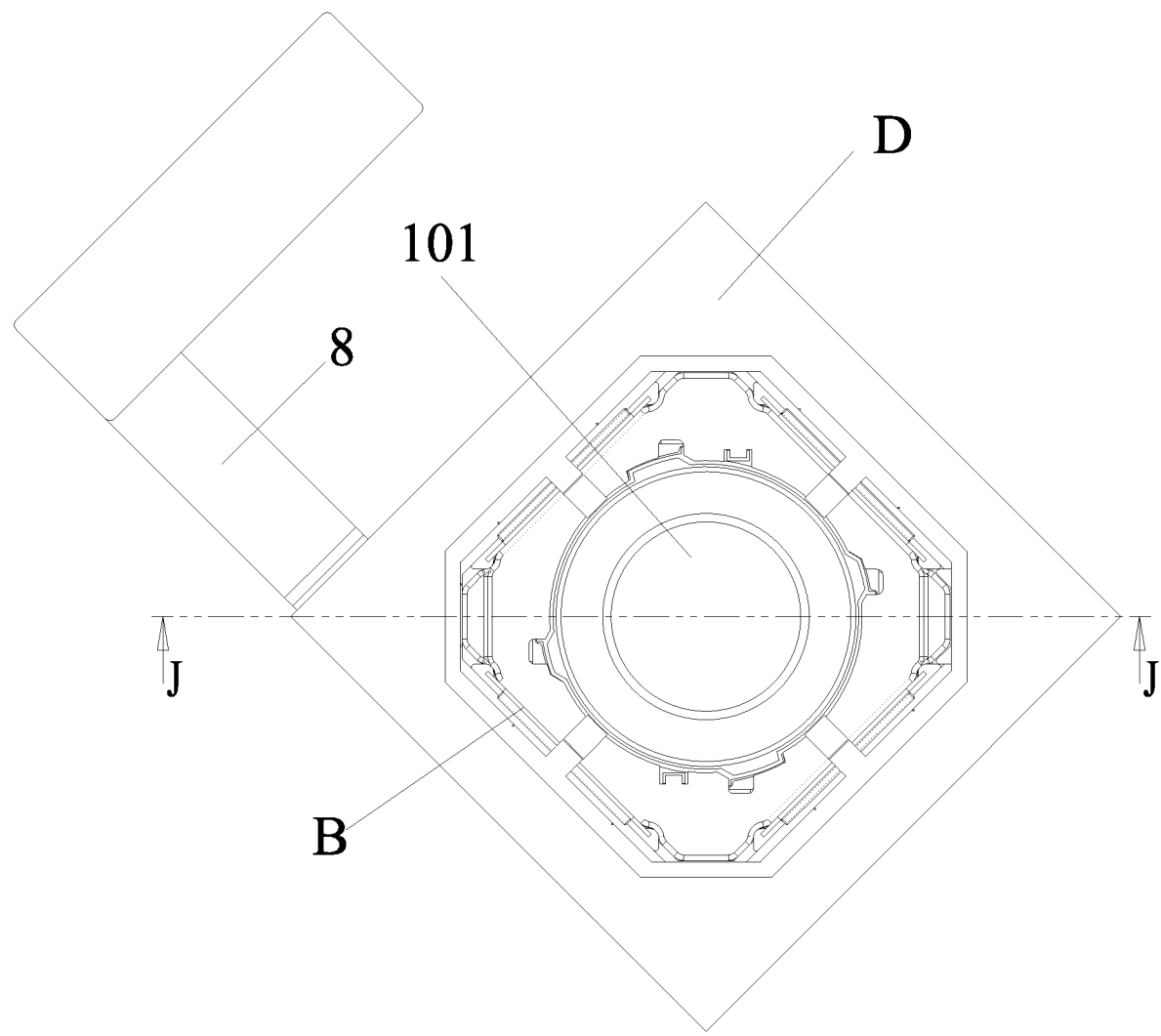
FIG. 7 is a top view from another perspective according to Embodiment 1 of the present disclosure.
Figure 8:
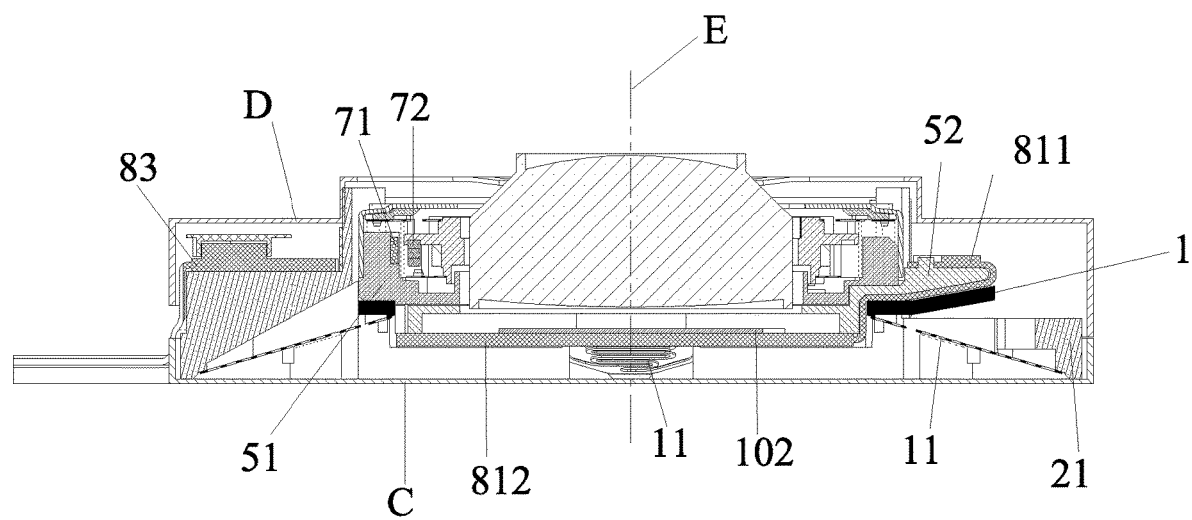
FIG. 8 is a sectional view of J-J in FIG. 7.

Referring to FIG. 3, it is to be noted that there are four gimbal drive assemblies 3 that are respectively arranged at four edges of the camera module B in the embodiment of the present disclosure. In response to a vibration in the Rx+ or Rx− direction, the lens 101 rotates toward the Rx− or Rx+ direction by changing, in the Y direction, electromagnetic forces generated by gimbal coils 31 in two opposite sets of the gimbal drive assemblies 3, thereby achieving the stabilizing effect in the Rx direction.

Further, in order to realize closed-loop compensation for the movable gimbal portion 1 and the camera module B under the gravity action, the MGS camera module in the embodiment of the present disclosure includes a gimbal position detection unit 10. The gimbal position detection unit 10 is provided at a central position of the gimbal coil 31, and electrically connected to the conductive structure 22. The gimbal position detection unit 10 can obtain a relative position of the movable gimbal portion 1 relative to the static gimbal portion 2, generates a third detection signal and feeds the third detection signal back to the control unit 9. The control unit 9 generates a third control signal to control the gimbal coil 31 to generate an electromagnetic force having preset parameters, such that the movable gimbal portion 1 moves to compensate a displacement of the movable gimbal portion 1 under the gravity action. The preset parameters include a direction and an amplitude of the electromagnetic force.

In the embodiment of the present disclosure, when the control unit 9 controls the gimbal coil 31 to generate the electromagnetic force having the preset parameters, in order to compensate the displacements of the movable gimbal portion 1 and the camera module B under the gravity action, the direction of the electromagnetic force generated by the gimbal coil 31 is basically the same as the optical axis E direction. Specifically, an included angle between a direction of an electromagnetic force generated by the gimbal coil 31 and the optical axis E direction is not greater than 20°. Therefore, the movable gimbal portion 1 and the camera module B move along the optical axis E direction under a combined action of at least two sets of the gimbal drive assemblies 3 to realize the compensation.

Figure 9:
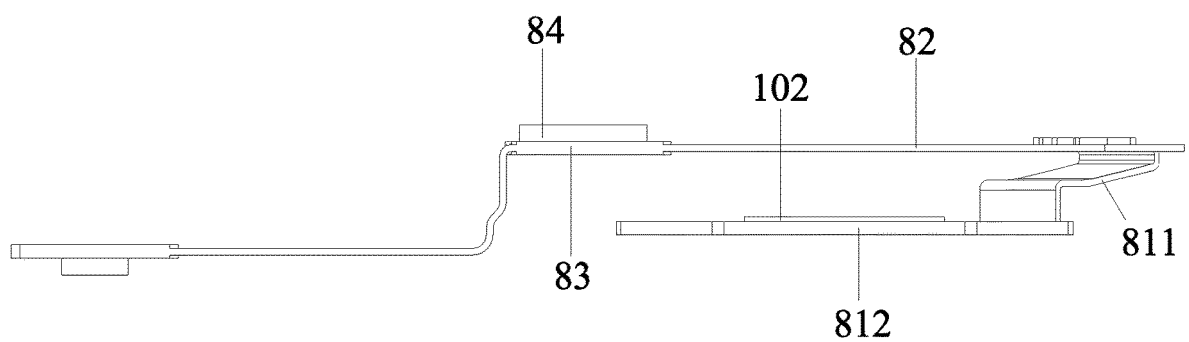
FIG. 9 is a front view of a circuit board according to Embodiment 1 of the present disclosure.
Figure 10:
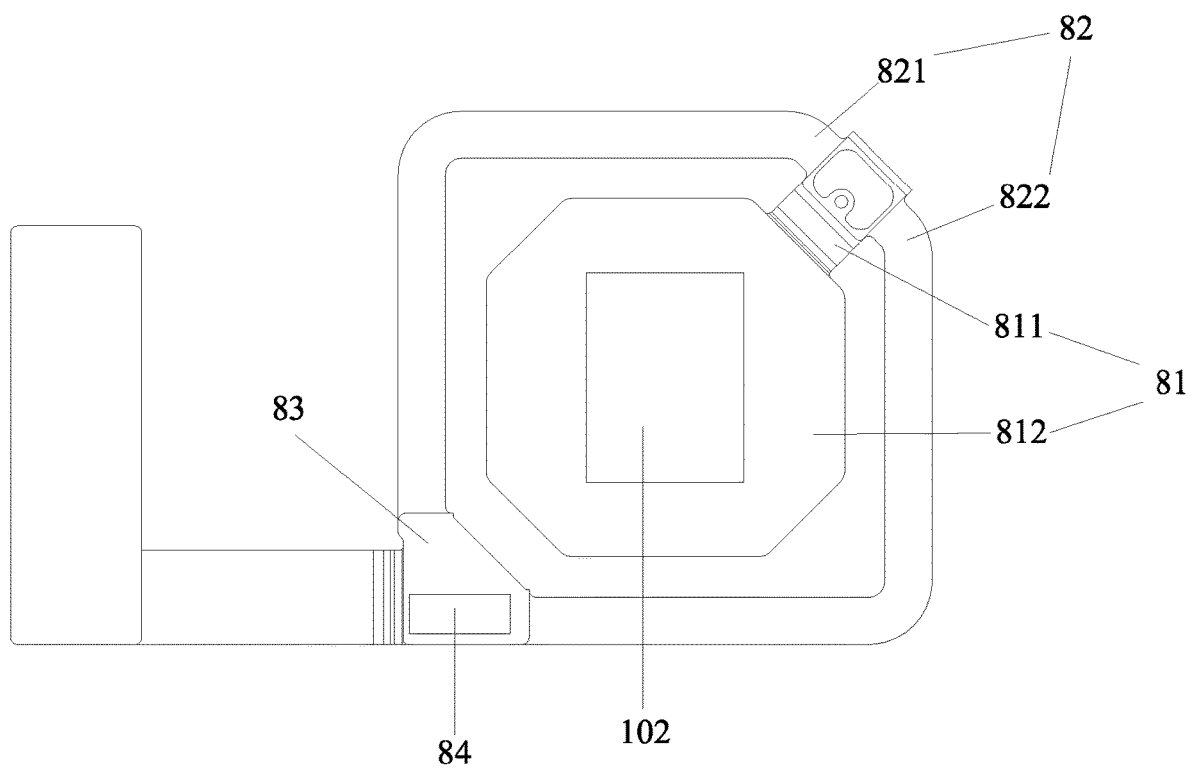
FIG. 10 is a top view of a circuit board according to Embodiment 1 of the present disclosure.
Figure 11:
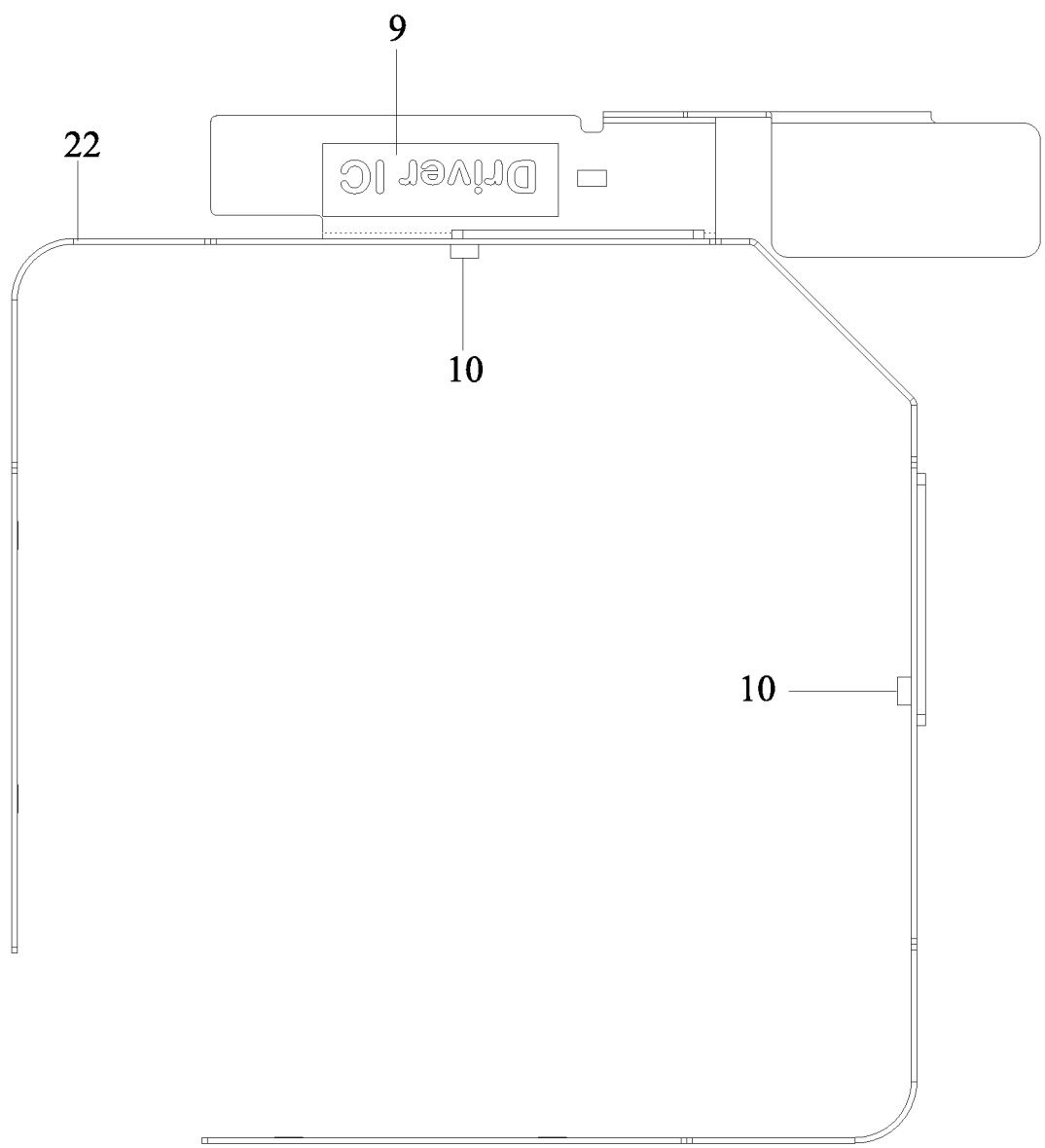
FIG. 11 is a top view of a conductive structure according to Embodiment 1 of the present disclosure.
Figure 12:
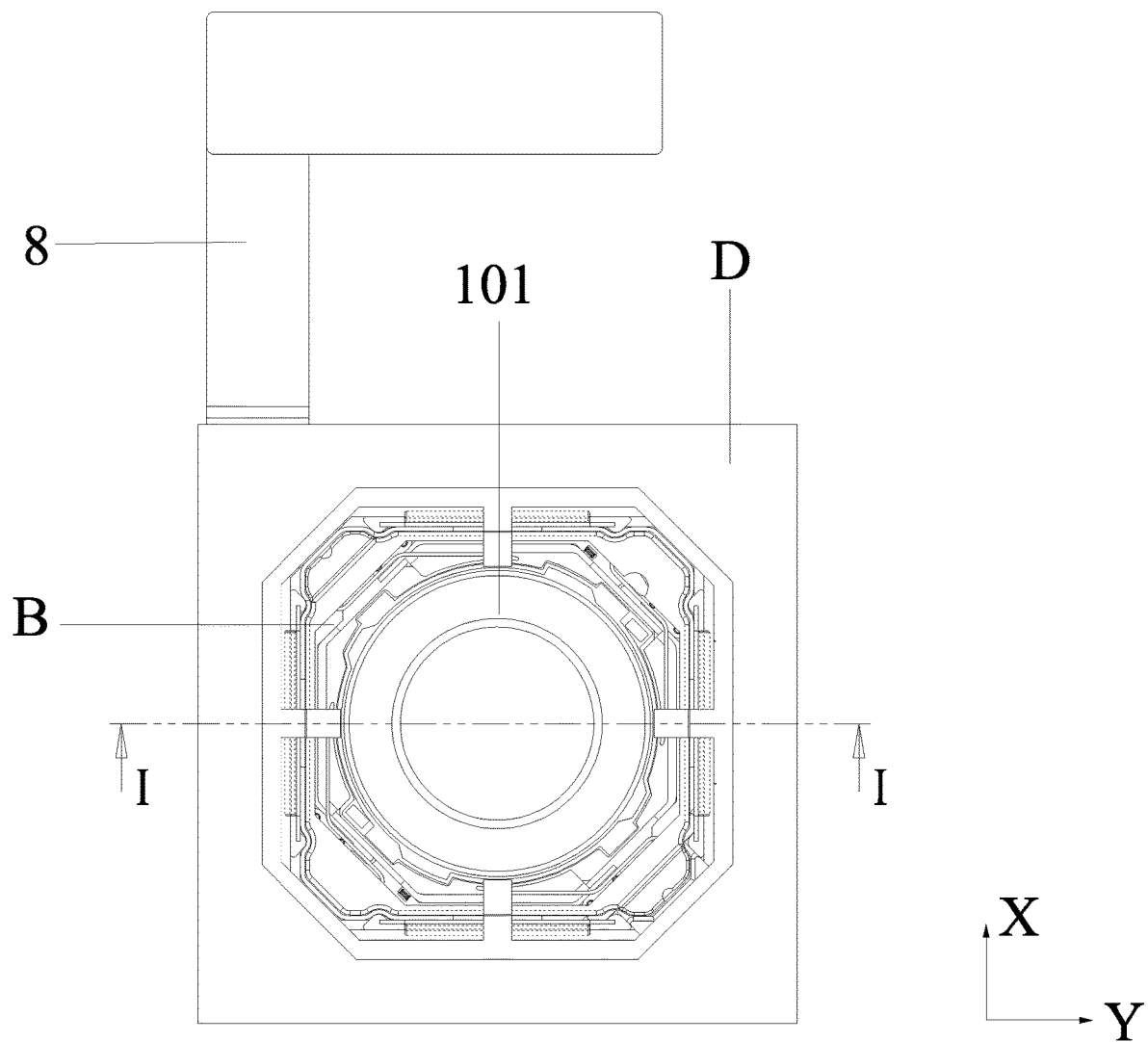
FIG. 12 is a top view according to Embodiment 2 of the present disclosure.

Further, referring to FIG. 9 and FIG. 10, the circuit board 8 in the embodiment of the present disclosure includes a movable circuit portion 81, an elastic circuit portion 82, and a static circuit portion 83. The elastic circuit portion 82 is connected to the movable circuit portion 81 and the static circuit portion 83 respectively. The movable circuit portion 81 is connected to the static focusing portion 5. The static circuit portion 83 is connected to the static gimbal portion 2. The image sensor 102 is provided on the movable circuit portion 81. The lens 101 is provided above the image sensor 102 and connected to the movable focusing portion 4. Specifically, the focusing base 52 is fixedly connected to the movable focusing portion 4, and the focusing magnet seat 51 is fixedly connected to the focusing base 52. In this way, positions of the image sensor 102 and the lens 101 of the camera module B are fixed basically and relatively in stabilization, the image quality and the stabilizing effect are not reduced significantly at an edge of the image, and for the sake of stabilization, there is no need to sacrifice a part of an optical resolution of the lens 101 and a part of an optical resolution of the image sensor 102 to improve quality of a photographed image.

The movable circuit portion 81 includes a movable connecting segment 811 and a mounting panel 812. The movable connecting segment 811 includes one end connected to the elastic circuit portion 82, and the other end inclining and extending toward a direction away from the elastic circuit portion 82 and being connected to the mounting panel 812. The image sensor 102 is provided on the mounting panel 812. The focusing base 52 is fixedly connected to the mounting panel 812 or the movable connecting segment 811.

Optionally, a minimum distance between the image sensor 102 and the elastic circuit portion 82 along the optical axis E direction is greater than 10% of a height of the MGS camera module along the optical axis E direction, and the elastic circuit portion 82 is provided above the image sensor 102, which reduces a height of the image sensor 102 on the MGS camera module along the optical axis E direction. In addition, the lens 101 is provided above the image sensor 102 and close to the image sensor 102. While a distance between the camera module B and the image sensor 102 is kept, a center of rotation of the lens 101 can be in closer proximity to a plane where the elastic circuit portion 82 is located. Since the static circuit portion 83 is connected to the static gimbal portion 2, and the static circuit portion 83 is connected to the static circuit portion 81 through the elastic circuit portion 82, the elastic circuit portion 82 has a small deformation amount when the camera module B and the movable gimbal portion 1 rotate relative to the static gimbal portion 2, thereby lowering an energy consumption of the MGS camera module in stabilization.

Further, since the movable connecting segment 811 includes one end connected to the elastic circuit portion 82, and the other end inclining and extending toward a direction away from the elastic circuit portion 82 and being connected to the mounting panel 812, and the image sensor 102 is provided on the mounting panel 812, a space for accommodating the MGS A and the camera module B can be formed above the static circuit portion 81. In this case, the elastic circuit portion 82 in proximity to a plane where the center of rotation of the lens 101 is located is provided outside the MGS A, namely the elastic circuit portion 82 is provided outside the gimbal magnet 32. Consequently, while the gimbal magnet 32 and the gimbal coil 31 are opposite to each other, there is no need to avoid the elastic circuit component in the optical axis E direction, thereby reducing the height of the MGS camera module in the optical axis E direction.

In the embodiment of the present disclosure, the elastic circuit portion 82 includes a first elastic arm 821 and a second elastic arm 822. One end of the first elastic arm 821 and one end of the second elastic arm 822 are fixedly connected to the movable circuit portion 81. The other end of the first elastic arm 821 and the other end of the second elastic arm 822 are fixedly connected to the static circuit portion 83. The first elastic arm 821 and the second elastic arm 822 surround the MGS A, such that the movable circuit portion 81 is reliably and stably connected to the static circuit portion 83.

In the embodiment of the present disclosure, the static circuit portion 83 is provided with a socket 84. The static circuit portion 83 is connected to the conductive structure 22 through the socket 84, such that the circuit board 8 and the conductive structure 22 are quickly assembled and located.

Embodiment 2

Referring to FIGS. 12-15, the embodiment of the present disclosure provides an MGS camera module, including a control unit 9, an MGS A, a camera module B, a bottom housing C, and an outer housing D. The bottom housing C and the outer housing D are cooperatively fixed to form a space for accommodating the MGS A and the camera module B. Both the MGS A and the camera module B are arranged in the space.

The MGS A includes a movable gimbal portion 1, a static gimbal portion 2, and gimbal drive assemblies 3. The static gimbal portion 2 includes a conductive structure 22 and a gimbal base 21. The gimbal base 21 is fixedly connected to the bottom housing C. The conductive structure 22 is fixedly connected to the gimbal base 21. The gimbal drive assemblies 3 each include a gimbal magnet 32 and a gimbal coil 31. The gimbal coil 31 is fixed on the conductive structure 22 and electrically connected to the conductive structure 22.

The movable gimbal portion 1 serves as a gimbal magnet seat. The gimbal magnet 32 is fixedly connected to the gimbal magnet seat and opposite to the gimbal coil 31. The gimbal magnet seat is movably connected to the gimbal base 21 through elastic gimbal component 11s.

In the embodiment, the gimbal magnet 32 is fixed on an outer sidewall of the gimbal magnet seat. The gimbal coil 31 is fixed on an inner surface of the conductive structure 22. The gimbal magnet 32 is provided inside the gimbal coil 31 and opposite to the gimbal coil 31, and configured to provide a magnetic field.

Figure 13:
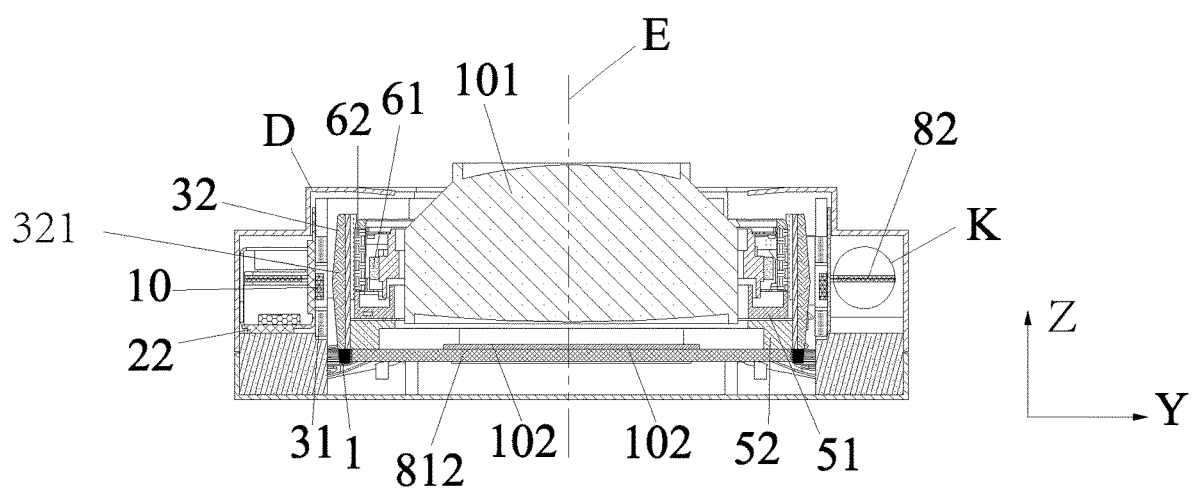
FIG. 13 is a sectional view of I-I in FIG. 12.

Referring to FIG. 13, an outer sidewall of the gimbal magnet 32 protrudes toward the gimbal coil 31 to form a bump 321. Preferably, the bump 321 comprises a chamfered surface formed by protruding the outer sidewall of the gimbal magnet 32 toward the gimbal coil 31. When the movable gimbal portion 1 and the static gimbal portion 2 are stable, a turning angle of the chamfered surface formed by the outer sidewall of the gimbal magnet 32 corresponds to a center of the gimbal coil 31, which improves the utilization rate of a space between the gimbal magnet 32 and the gimbal coil 31, and makes the module smaller. When the movable gimbal portion 1 rotates relative to the static gimbal portion 2 in stabilization, a distance between the gimbal magnet 32 and the gimbal coil 31 is basically the same, such that an electromagnetic force generated by the gimbal coil 31 is stably applied to the gimbal magnet 32 in the stabilization, thereby ensuring a stable stabilizing effect, increasing an electromagnetic torque, and lowering a power consumption.

Optionally, in other embodiments, the outer sidewall of the gimbal magnet 32 protrudes toward the gimbal coil 31 to form an arc-shaped, spherical or cylindrical bump 321, such that an electromagnetic force of the gimbal coil 31 applied to the gimbal magnet 32 keeps stable in stabilization.

Further, in the embodiment of the present disclosure, the static focusing portion 5 in the camera module B is relatively fixed with the movable gimbal portion 1. The static focusing portion 5 is connected to the static circuit portion 81 of the circuit board 8. The static circuit portion 83 is connected to the static gimbal portion 2. The static circuit portion 83 is connected to the static circuit portion 81 through the elastic circuit portion 82. Therefore, both the camera module B and the movable gimbal portion 1 can move relative to the static gimbal portion 2 through the elastic circuit portion 82.

Preferably, the elastic circuit portion 82 in the embodiment of the present disclosure includes a first elastic arm 821 and a second elastic arm 822. One end of the first elastic arm 821 and one end of the second elastic arm 822 are fixedly connected to the movable circuit portion 81. The other end of the first elastic arm 821 and the other end of the second elastic arm 822 are fixedly connected to the static circuit portion 83. The first elastic arm 821 and the second elastic arm 822 surround the MGS A, such that the movable circuit portion 81 is reliably and stably connected to the static circuit portion 83.

Figure 14:
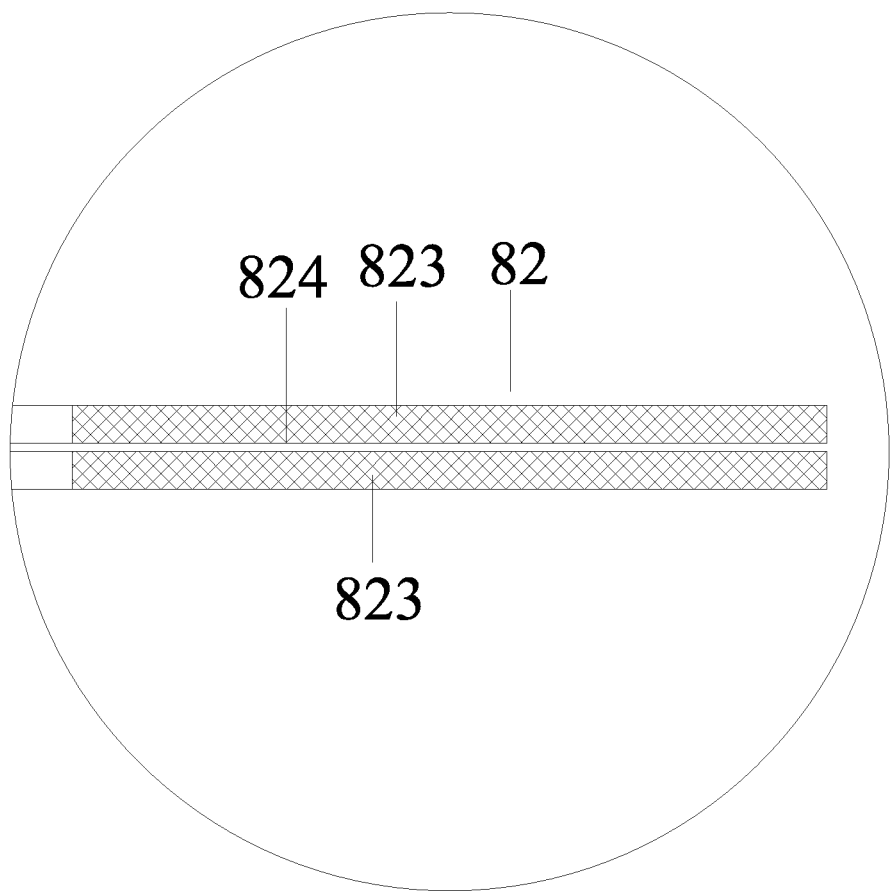
FIG. 14 is a schematic enlarged view of K in FIG. 13.

Further, referring to FIG. 14, the elastic circuit portion 82 includes at least two circuit layers 823. A spacing 824 is provided between adjacent two of the circuit layers 823, which can effectively reduce a spring constant of the elastic circuit portion 82, and lower a power consumption when the camera module B and the movable gimbal portion 1 rotate relative to the static gimbal portion 2. Specifically, the elastic circuit portion 82 includes two circuit layers 823 in the embodiment.

In the embodiment of the present disclosure, in order to realize closed-loop compensation for the movable gimbal portion 1 and the camera module B under a gravity action, the MGS camera module in the embodiment of the present disclosure includes a gimbal position detection unit 10. The gimbal position detection unit 10 is provided at a central position of the gimbal coil 31. The gimbal position detection unit 10 can obtain a relative position of the movable gimbal portion 1 relative to the static gimbal portion 2, generates a third detection signal and feeds the third detection signal back to the control unit 9. The control unit 9 generates a third control signal to control the gimbal coil 31 to generate an electromagnetic force having preset parameters, such that the movable gimbal portion 1 moves to compensate a displacement of the movable gimbal portion 1 under the gravity action. The preset parameters include a direction and an amplitude of the electromagnetic force.

Figure 15:
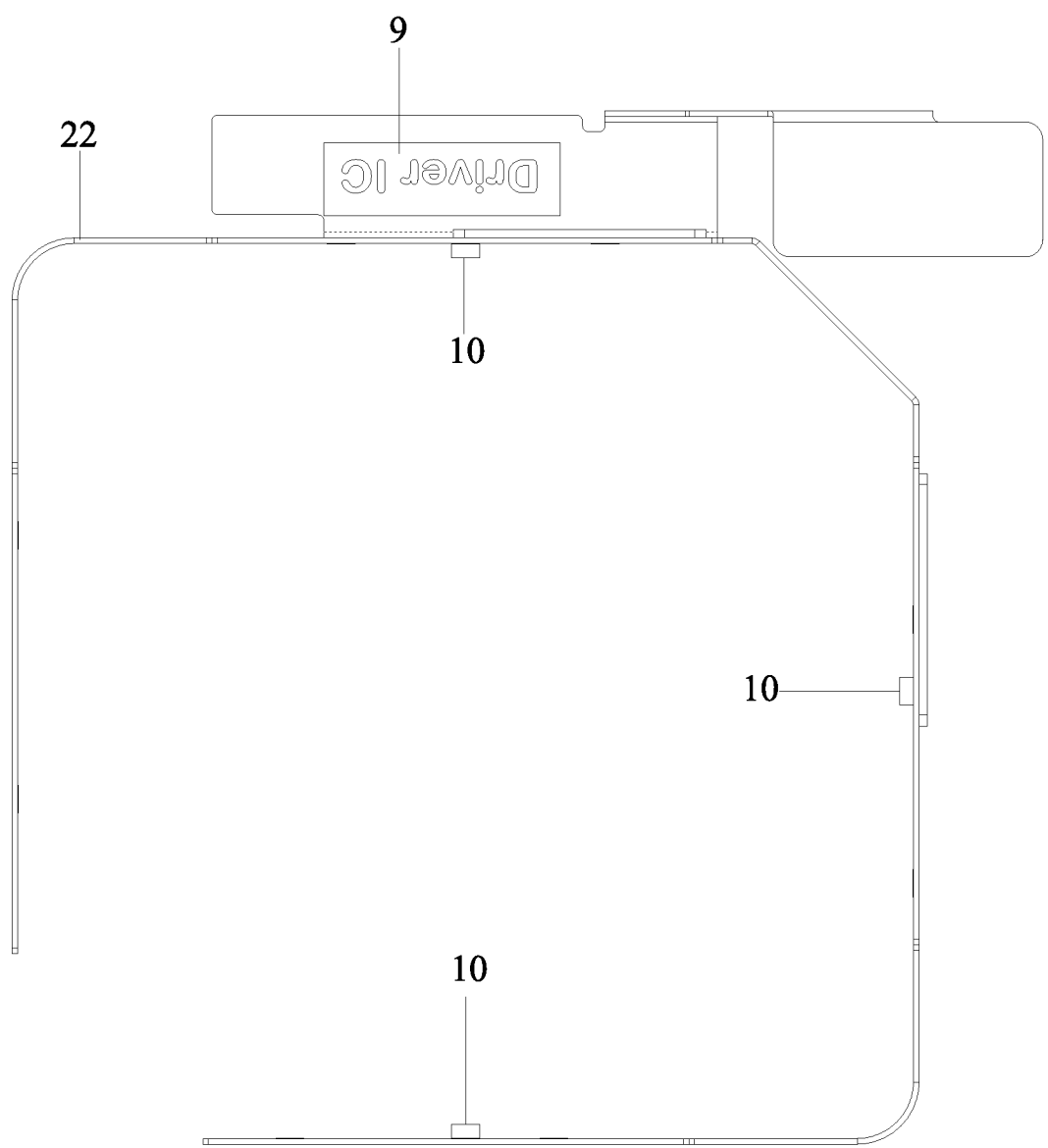
FIG. 15 is a top view of a conductive structure according to Embodiment 2 of the present disclosure.

Specifically, referring to FIG. 15, three gimbal position detection units 10 are provided in the embodiment, each of which is arranged on an inner sidewall of the conductive structure 22 and located at the central position of the gimbal coil 31. A stabilization control chip obtains the position of the movable gimbal portion 1 relative to the static gimbal portion 2 through three gimbal position sensors, generates a third detection signal, and feeds the third detection signal back to the stabilization control chip. The stabilization control chip outputs a third control signal to change an amplitude and a direction of a current in the gimbal coil 31. The gimbal coil 31 drives the gimbal magnet 32 for a displacement, thereby driving the movable gimbal portion 1 to move relative to the static gimbal portion 2, and achieving a position compensating or stabilizing effect.

Embodiment 3

Figure 16:
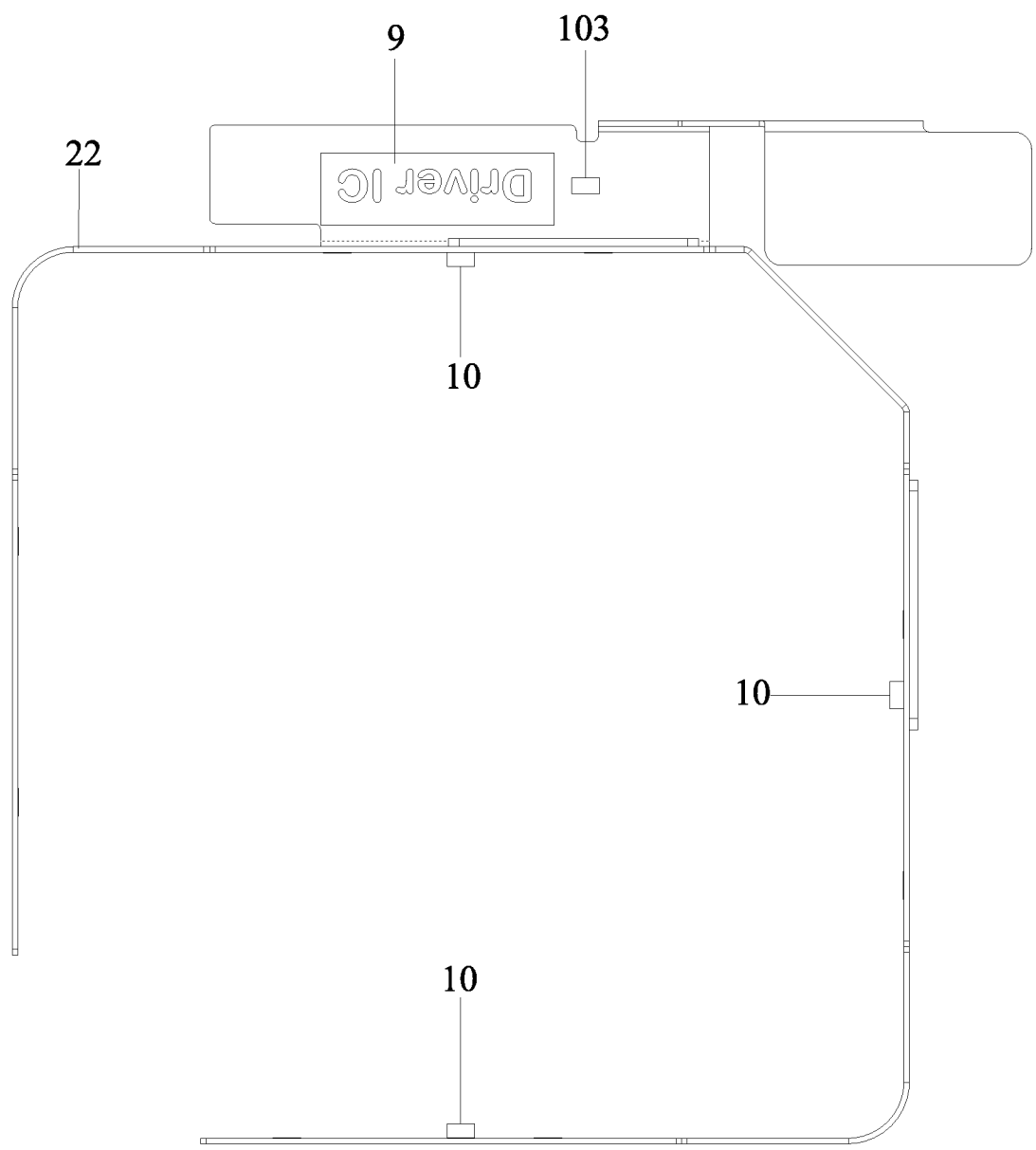
FIG. 16 is a top view of a conductive structure according to Embodiment 3 of the present disclosure.

The embodiment differs from Embodiment 1 or Embodiment 2 in: Referring to FIG. 16, in order to realize closed-loop compensation for the movable gimbal portion 1 and the camera module B under a gravity action, the MGS camera module in Embodiment 3 of the present disclosure includes a gravity sensing unit 103. The gravity sensing unit 103 can obtain a gravity environment where the MGS camera module is located presently, generates a second detection signal and feeds the second detection signal back to the control unit 9. The control unit 9 generates a second control signal to control the gimbal coil 31 to generate an electromagnetic force having preset parameters, thereby driving the movable gimbal portion 1 to compensate a displacement of the movable gimbal portion 1 under the gravity action.

Specifically, the gravity sensing unit 103 in Embodiment 3 of the present disclosure is provided on the conductive structure 22, electrically connected to the control unit 9, and electrically connected to the circuit board 8 through the conductive structure 22, thereby realizing a connection with an external circuit.

The specification discloses the present disclosure with the accompanying drawings, and also enable those skilled in the art to practice the present disclosure, including making and using any devices or systems, using appropriate materials and performing any incorporated methods. The scope of the present disclosure is defined by the claims, and includes other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A micro gimbal stabilizer (MGS) camera module, comprising:

an MGS comprising a movable gimbal portion, a static gimbal portion movably connected to the movable gimbal portion, and gimbal drive assemblies, wherein the gimbal drive assemblies are capable of driving the movable gimbal portion to rotate relative to the static gimbal portion, the gimbal drive assemblies each comprise a gimbal coil and a gimbal magnet that are opposite to each other, the gimbal coil is provided on the static gimbal portion, and the gimbal magnet is provided on the movable gimbal portion;

a camera module comprising a movable focusing portion, a static focusing portion movably connected to the movable focusing portion, a focusing drive assembly, and a focusing feedback assembly, wherein the static focusing portion is relatively fixed with the movable gimbal portion, the focusing drive assembly is capable of driving the movable focusing portion to move relative to the static focusing portion along an optical axis direction, the focusing drive assembly comprises a focusing coil and a focusing magnet that are opposite to each other, the focusing coil is provided on the movable focusing portion, the focusing magnet is provided on the static focusing portion, the focusing feedback assembly comprises a focusing position sensor and a position magnet, the position magnet is provided on the movable focusing portion, and the focusing position sensor is provided on the static focusing portion;

at least one control unit, wherein the control unit is configured to generate a first control signal according to a first detection signal sent from the focusing position sensor and control a moving distance of the movable focusing portion;

wherein the camera module further comprises a lens and a circuit board; the gimbal coil, the focusing coil, the focusing position sensor, and the control unit are all electrically connected to the circuit board; the circuit board comprises a movable circuit portion, an elastic circuit portion, and a static circuit portion; the elastic circuit portion is connected to the movable circuit portion and the static circuit portion respectively; the movable circuit portion is connected to the static focusing portion; the static circuit portion is connected to the static gimbal portion; the movable circuit portion is provided with an image sensor; and the lens is provided above the image sensor and connected to the movable focusing portion; and wherein a minimum distance between the image sensor and the elastic circuit portion along the optical axis direction is greater than 10% of a height of the MGS camera module along the optical axis direction, and the elastic circuit portion is provided above the image sensor.

2. The MGS camera module according to claim 1, wherein multiple sets of the gimbal drive assemblies are provided, and the gimbal coil in each of the multiple sets of the gimbal drive assemblies is capable of being controlled independently.

3. The MGS camera module according to claim 2, wherein the camera module is provided with two sets of the gimbal drive assemblies which are respectively arranged at two sides of the camera module in a direction perpendicular to an optical axis, and the gimbal coil of each of the two sets of the gimbal drive assemblies is capable of being controlled independently.

4. The MGS camera module according to claim 2, further comprising a gravity sensing unit, wherein the control unit is configured to generate a second control signal according to a second detection signal fed back from the gravity sensing unit, thereby controlling the gimbal coil to generate an electromagnetic force having preset parameters.

5. The MGS camera module according to claim 2, further comprising a gimbal position detection unit, wherein the gimbal position detection unit is provided at a central position of the gimbal coil, and the control unit is configured to generate a third control signal according to a third detection signal fed back from the gimbal position detection unit, thereby controlling the gimbal coil to generate an electromagnetic force having preset parameters; and the third detection signal is position information of the movable gimbal portion relative to the static gimbal portion, and the preset parameters comprise a direction and a magnitude of the electromagnetic force.

6. The MGS camera module according to claim 2, wherein an included angle between an electromagnetic force generated by the gimbal coil and the optical axis direction is not greater than 20°.

7. The MGS camera module according to claim 1, wherein the movable circuit portion comprises a movable connecting segment and a mounting panel, the movable connecting segment comprises one end connected to the elastic circuit portion, and the other end inclining and extending toward a direction away from the elastic circuit portion and being connected to the mounting panel, and the image sensor is provided on the mounting panel.

8. The MGS camera module according to claim 1, wherein the elastic circuit portion is provided outside the MGS.

9. The MGS camera module according to claim 1, wherein the elastic circuit portion comprises at least two circuit layers, and a spacing is provided between two of the circuit layers.

10. The MGS camera module according to claim 1, wherein the elastic circuit portion comprises a first elastic arm and a second elastic arm, one end of the first elastic arm and one end of the second elastic arm are fixedly connected to the movable circuit portion, the other end of the first elastic arm and the other end of the second elastic arm are fixedly connected to the static circuit portion, and the first elastic arm and the second elastic arm surround the MGS.

11. The MGS camera module according to claim 1, wherein the static circuit portion is provided with a socket.

12. The MGS camera module according to claim 1, wherein an outer sidewall of the gimbal magnet protrudes toward the gimbal coil to form a bump.

13. The MGS camera module according to claim 12, wherein the bump comprises an arc surface, a cylindrical surface, a spherical surface, or a chamfered surface, the arc surface, the cylindrical surface, the spherical surface, or the chamfered surface being formed by protruding the outer sidewall of the gimbal magnet toward the gimbal coil.

14. The MGS camera module according to claim 1, wherein the MGS further comprises elastic gimbal components respectively connected to the movable gimbal portion and the static gimbal portion.

15. The MGS camera module according to claim 14, wherein there are at least three elastic gimbal components that are arranged along a circumferential direction of the optical axis and located on at least three unparallel planes.

16. The MGS camera module according to claim 1, wherein the camera module further comprises an elastic focusing component connected to the movable focusing portion and the static focusing portion respectively.

17. The MGS camera module according to claim 16, wherein the elastic focusing component comprises an upper supporting spring piece and a lower supporting spring piece for supporting and suspending the movable focusing portion; the upper supporting spring piece comprises one end fixed on the movable focusing portion, and the other end fixed on the static focusing portion; and the lower supporting spring piece comprises one end fixed on the movable focusing portion, and the other end fixed on the static focusing portion.

18. The MGS camera module according to claim 1, wherein the static gimbal portion further comprises a gimbal base and a conductive structure, the conductive structure is provided on the gimbal base and electrically connected to the circuit board, and the control unit and the gimbal coil are fixed with and electrically connected to the conductive structure.

19. The MGS camera module according to claim 1, further comprising a bottom housing and an outer housing, wherein the outer housing and the bottom housing are cooperatively fixed, and a space formed by the bottom housing and the outer housing is configured to accommodate the MGS and the camera module.

* * * * *